United States Patent
Elliott et al.

(10) Patent No.: US 9,459,115 B1
(45) Date of Patent: Oct. 4, 2016

(54) UNOBSTRUCTED MAP NAVIGATION USING ANIMATION

(71) Applicant: Amazon Technologies, Inc., Reno, NV (US)

(72) Inventors: Brian Lee Elliott, Seattle, WA (US); Robin Kim Har, Seattle, WA (US); Michael Zohar Podwal, Seattle, WA (US); Lorian MacLean Kiesel Taylor, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 36 days.

(21) Appl. No.: 14/229,728

(22) Filed: Mar. 28, 2014

(51) Int. Cl.
*G01C 21/36* (2006.01)
*G08G 1/0968* (2006.01)

(52) U.S. Cl.
CPC .......... *G01C 21/3655* (2013.01); *G01C 21/36* (2013.01); *G01C 21/3632* (2013.01); *G01C 21/3635* (2013.01); *G08G 1/096861* (2013.01)

(58) Field of Classification Search
CPC .............. G01C 21/36; G01C 21/3632; G01C 21/3635; G01C 21/3655; G08G 1/096861
See application file for complete search history.

(56) References Cited

U.S. PATENT DOCUMENTS

| | | | | |
|---|---|---|---|---|
| 5,874,905 A * | 2/1999 | Nanba | ................. | G01C 21/3635 701/437 |
| 6,285,317 B1 * | 9/2001 | Ong | .............................. | 701/439 |
| 7,395,152 B2 * | 7/2008 | Watanabe et al. | ............. | 701/437 |
| 7,647,170 B2 * | 1/2010 | Sawaki | .............. | G01C 21/3632 701/436 |
| 8,825,406 B2 * | 9/2014 | Kumon | ................. | G01C 21/365 701/533 |
| 2004/0243307 A1 * | 12/2004 | Geelen | ............... | G01C 21/3635 701/469 |
| 2005/0273252 A1 * | 12/2005 | Nix | ..................... | G01C 21/3632 701/431 |
| 2006/0155466 A1 * | 7/2006 | Kanda et al. | ................. | 701/209 |
| 2006/0195257 A1 * | 8/2006 | Nakamura | ......... | G01C 21/3632 701/437 |
| 2008/0033642 A1 * | 2/2008 | Emoto et al. | ................. | 701/209 |
| 2009/0125234 A1 * | 5/2009 | Geelen | ............... | G01C 21/3647 701/533 |
| 2010/0256900 A1 * | 10/2010 | Yamaguchi et al. | .......... | 701/201 |
| 2011/0022295 A1 * | 1/2011 | Lee | .................... | G01C 21/3635 701/532 |
| 2012/0078511 A1 * | 3/2012 | Lim | .................... | G01C 21/3632 701/437 |
| 2014/0343843 A1 * | 11/2014 | Yanku | ................ | G01C 21/3632 701/491 |

OTHER PUBLICATIONS

Magellan Maestro 3100 User Manual, 2007, Magellan Navigation Inc., 631459-01 A, Cover page, pp. iii and 29.*

* cited by examiner

*Primary Examiner* — Dale W Hilgendorf
(74) *Attorney, Agent, or Firm* — Polsinelli LLP

(57) ABSTRACT

The subject technology provides a mapping view that enables a user to view, from their current location, a portion of a route to a destination including a graphical element corresponding to the current location and a second graphical element in the form of an arrow-shaped object to indicate a direction of a turn to be made on the route. As progress on route is made, when the current location of the user is within a distance threshold of the location of the turn to be made, the subject technology may animate the second graphical element to move in the direction of the turn along the route to another location where a subsequent turn is to be made. The second graphical element may remain stationary at this other location to indicate a direction of the subsequent turn until the user's current location reaches the distance threshold for this subsequent turn.

20 Claims, 16 Drawing Sheets

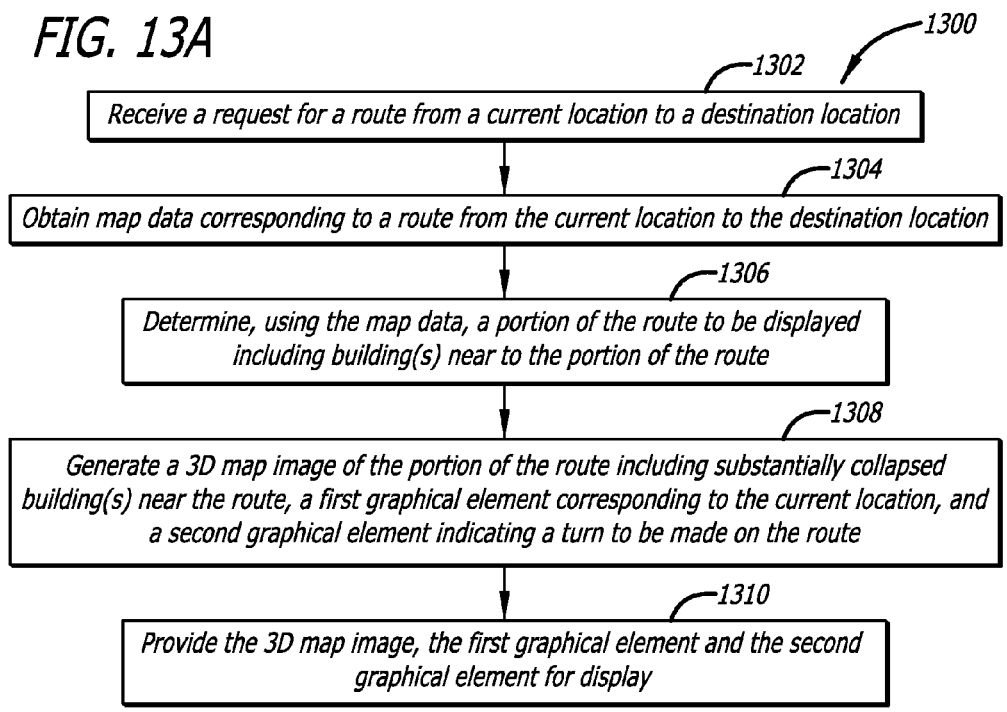
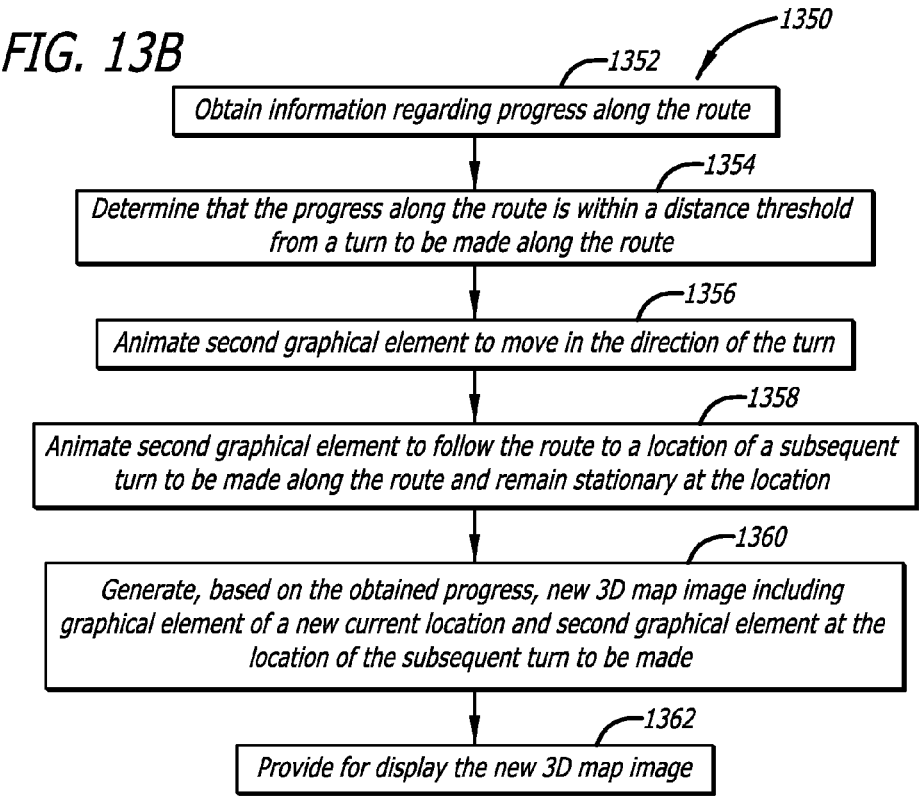

UNOBSTRUCTED MAP NAVIGATION USING ANIMATION

BACKGROUND

Many people utilize computer-based mapping applications to obtain the directions to a location, as well as to locate places near a current or specific location. A person wanting to perform such a task typically opens an application, inputs the necessary information (such as a location or point of interest) and may receive location information, driving directions, nearby points of interest as determined by the mapping application provider, and other such information. This information can be presented to the user graphically on a computing device. Information regarding turns or other actions along a given route, however, may not be presented in a manner that provides a user-friendly experience.

BRIEF DESCRIPTION OF THE DRAWINGS

The embodiments of the present technology will hereinafter be described in conjunction with the appended drawings, provided to illustrate and not to limit the technology, wherein like designations denote like elements, and in which:

FIGS. 13A and 13B illustrate example processes for displaying mapping information that can be used in accordance with some embodiments;

DETAILED DESCRIPTION

Figure 1:
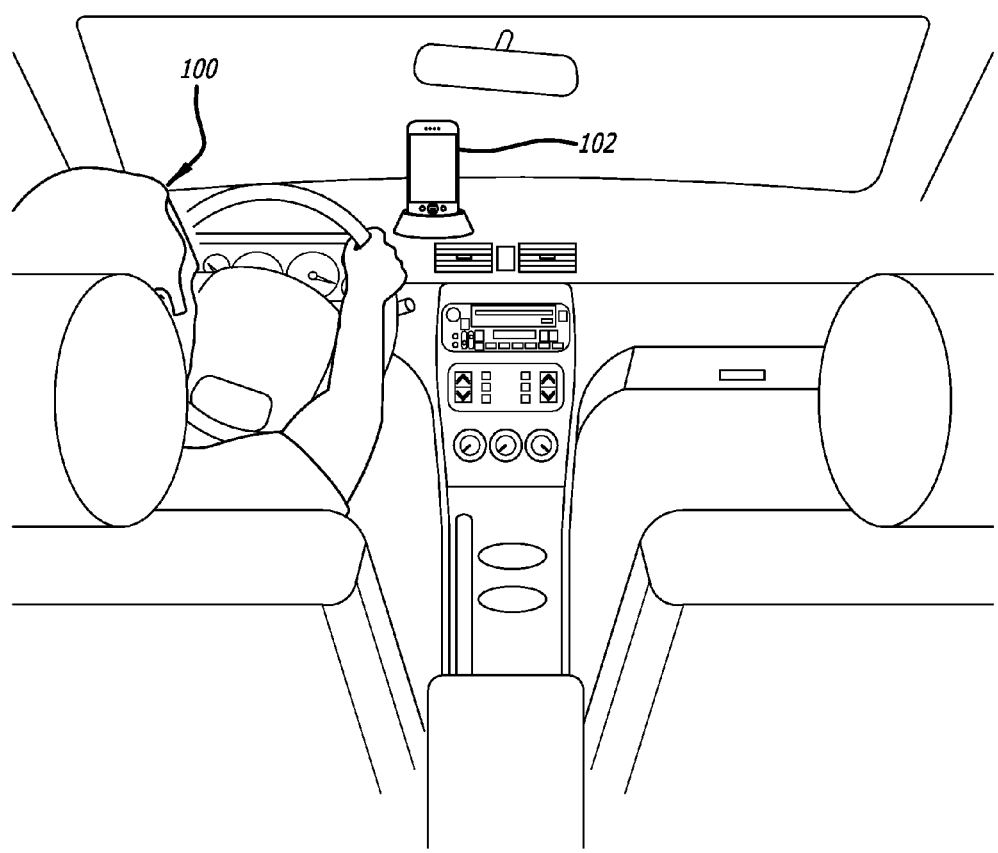
FIG. 1 shows an example situation where a user is in a vehicle with computing device mounted on the dashboard of the vehicle in accordance with some embodiments.

Systems and methods in accordance with various embodiments of the present disclosure may overcome one or more of the aforementioned and other deficiencies experienced in conventional approaches to providing information to a user. In particular, various approaches provide a mapping view that enables a user to view, with respect to a current location or another determined location, a route to a destination or other such location. This mapping view can include a three-dimensional view. A given route may include segments of a path that reach the destination. For some existing mapping applications, such as vehicle navigation software and systems, a turn on the route may be indicated in an aural manner, such a computerized voice giving a direction, or a graphical element that indicates an upcoming turn.

For example, upon receiving a request for a route (or directions) from a current location of the user (e.g., the current location of a computing device of the user in some embodiments) to a destination, a computing device can obtain and display a view of a map that includes the route and the destination. In some embodiments, the map can be rendered to appear three-dimensional (3D) in perspective which shows an appearance of depth in the view of the map. A 3D map may include 3D visual representations of features such as structures including buildings, roads or other structures, and/or geological features, such as terrain, bodies of water, landforms (e.g., berms, mounds, hills, cliffs, valleys, etc.), among others. By rendering a 3D map in perspective, a given mapping application provides a 3D view of a map that includes visual information for relative positions and/or depths of features. The mapping application may include 3D features within a map using primitive block shapes, or by using more complex models of such 3D features. In some further embodiments, the map can be rendered to appear as if the map is laid out on a shaped mapping surface, which can have a fixed or variable shape in different embodiments. In one example, a foreground region associated with the user's current location is rendered to appear to be substantially planar (the "planar region"), and at an angle with respect to the plane of the display screen such that the closest point of the foreground region appears to also be closest to the plane of the display screen (and hence the user), with the separation of the map surface from the plane of the display screen appearing to increase with an increase in distance from the current location. In some embodiments, the destination may not always be displayed, such as when only map data within a specified or determined distance is displayed at any given time and the destination lies beyond that distance.

However, some existing approaches will zoom in on the current location of the user and display, depending on the length of the route, only a relatively small portion thereof, such as a portion of the route including only the next turn (or no turn at all). This limited view is often based on the fact that turn-by-turn information is typically provided on mobile devices, such as GPS devices, tablets, smart phones, or wearable computers (e.g., watches or glasses), and the displays on these devices are often relatively small. Accordingly, only a certain amount of information can be provided and still be legible or determinable by a user. Often, a user will want to scroll, fast-forward, or otherwise navigate along the route in order to, for example, determine and/or anticipate the next few turns, anticipate the general direction in which the user is heading, or to check the user's progress along the route. Frequently having to provide input to the computing device to check progress or other information along the route can be distracting and/or frustrating, however, which can be potentially dangerous if the user is driving, and at least inconvenient in other situations. Accordingly, a mapping approach that provides more information regarding upcoming directions or turns along the route without further user engagement can be desirable for at least many users and/or situations.

Various other functions and advantages are described and suggested below as may be provided in accordance with the various embodiments.

FIG. 1 shows an example situation where user 100 is in a vehicle with computing device 102 mounted on the dashboard of the vehicle. In some instances, the user 100 may utilize a mapping application on the computing device 102 to provide directions from a current location of the user 100 and a destination. The mapping application, in some embodiments, may provide turn-by-turn directions to the destination in which the user 100 may be notified in the form of aural (e.g., voice) and/or visual instructions provided by the computing device 102. Although the computing device 102 is shown to be a smart phone, or similar mobile computing device, in this example, it should be understood that various other types of electronic or computing devices that are capable of determining and processing input and/or wireless signals can be used in accordance with various embodiments discussed herein. These devices can include, for example, notebook computers, tablet computers, desktop computers, GPS devices, personal data assistants, electronic book readers, video gaming consoles or controllers, televisions or smart televisions, wearable computers (e.g., glasses or watches), and portable media players, among others.

Figure 2:
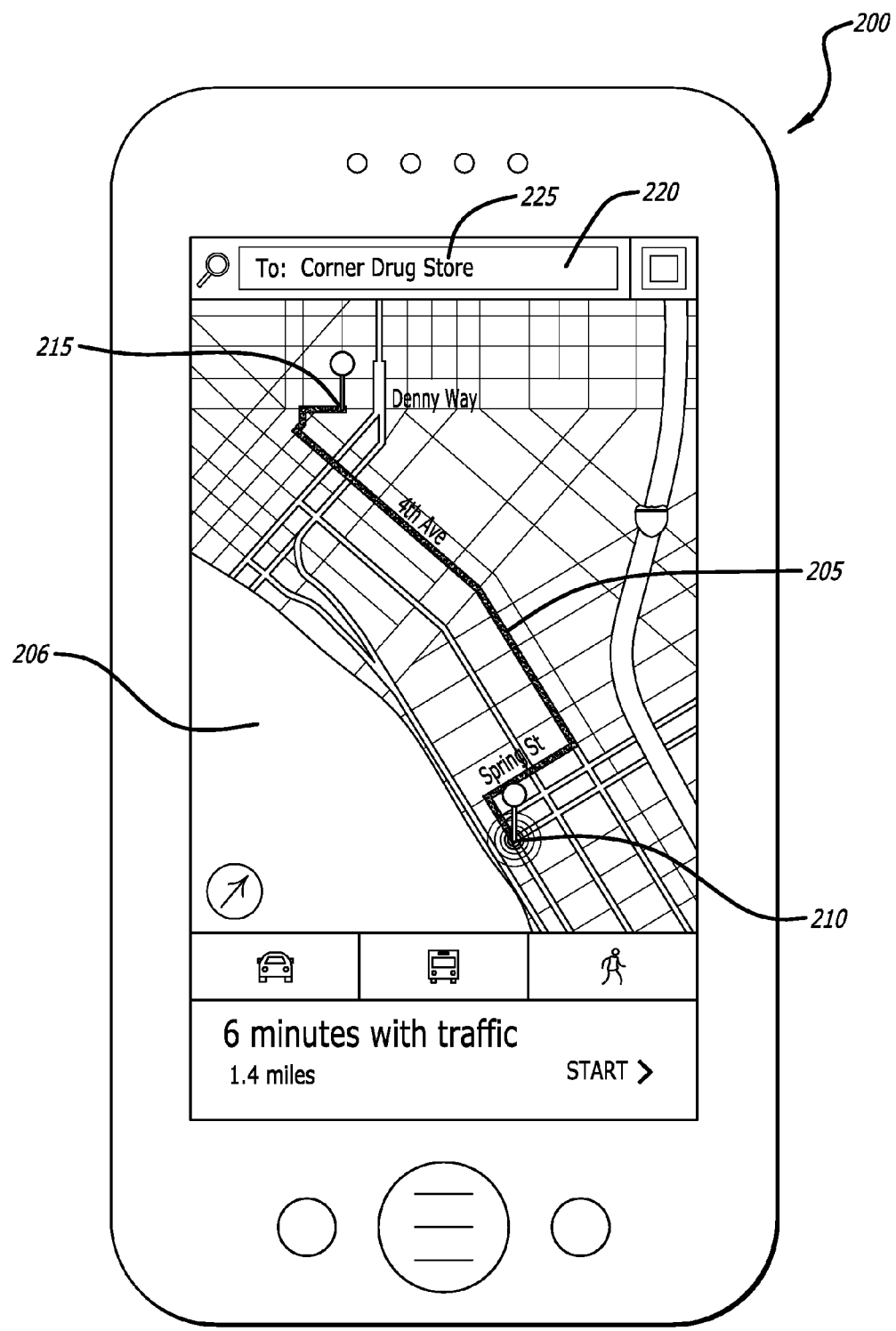
FIG. 2 shows an example display of mapping data that can be used in accordance with various embodiments, in accordance with some embodiments.

FIG. 2 shows an example display 200 of mapping data (or map data) that can be used in accordance with various embodiments. In the example of FIG. 2, a user has opened a map application on a computing device and provided information 225, such as a destination location, coordinates, or address, in an input box or field 220 (or any other appropriate way to accept information that is inputted by the user) in order to receive directions to the same. These directions can be from a current location of the computing device or a location specified by the user, among other such options. In at least one embodiment, the current location of the computing device may be determined using global positioning system (GPS) signals that the computing device receives from a GPS satellite(s), which may include information for coordinates in latitude and longitude positions. In this example, a route 205 for a user has been determined. Approaches to determining routes and directions or instructions between a current location and a destination are well known in the art and, as such, will not be discussed herein in detail. In some examples, the map application can determine the relevant map data and direction information, and can render a map view that includes at least a portion of the relevant map data as well as directions (e.g., driving, walking, public transportation, etc.) or other guiding information for the determined route 205 from a current location 210 (e.g., a starting point) to a destination 215. In at least one embodiment, the route 205 includes a single path, and the path includes a set of segments. A turn along the route 205 includes a connection between two respective segments of the path. The relevant map data may include information for the path, set of segments included in the path, and any turns that are included in the route 205. In some examples, the map application will initially display a straight overhead view of the mapping data on a what will appear to the user to be a substantially flat or planar surface, showing the route 205 (in its entirety or a selected portion) on displayed map data 206, which could cover a relatively small area if the user is going only a few miles away from the current location 210, for example, or could cover a large area if the user is driving, for example, through the state of California. Other factors such as the zoom level, screen size, and other aspects may affect how much of the map data is displayed as well, in at least some embodiments.

Figure 3:
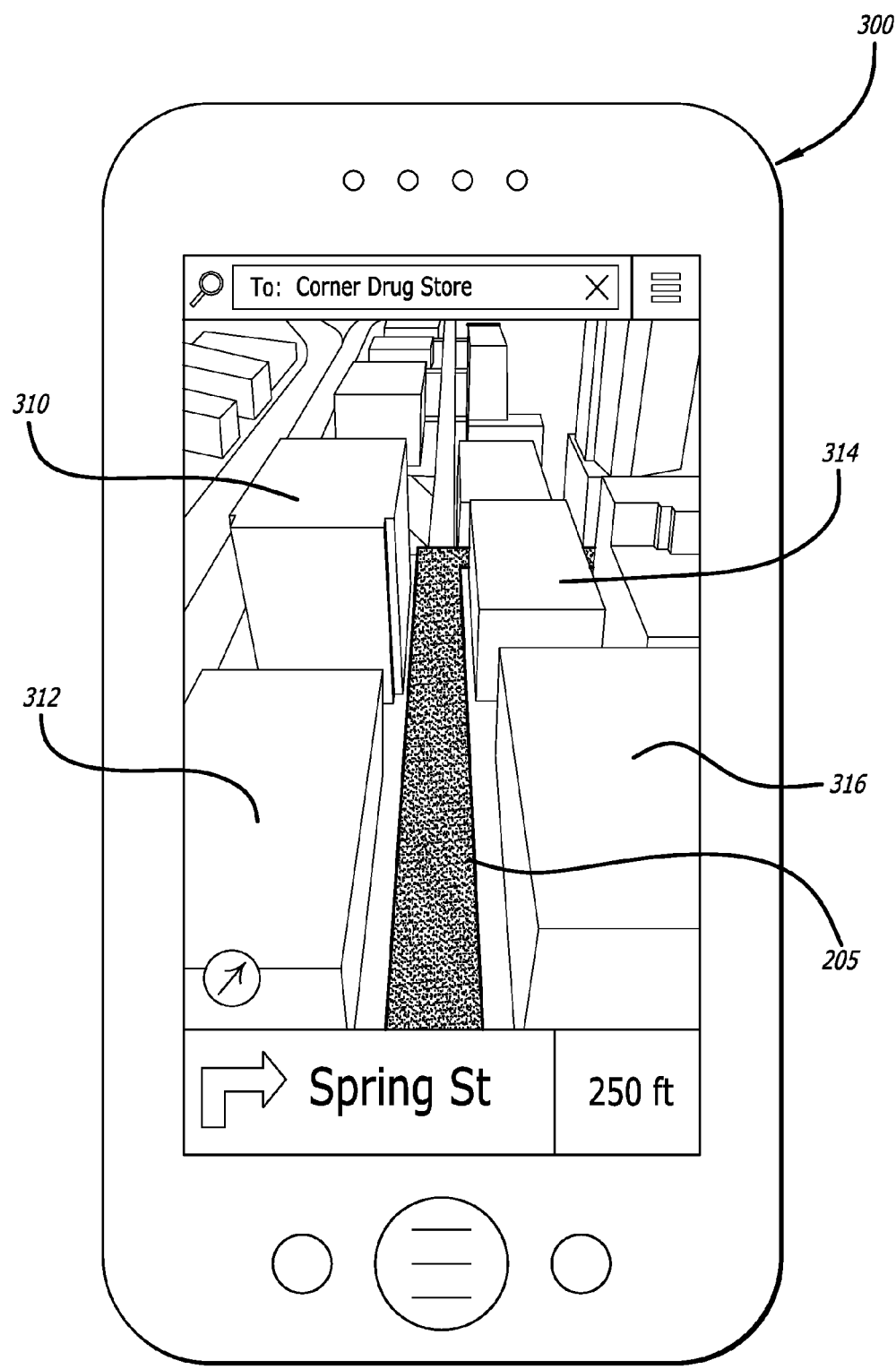
FIG. 3 illustrates a display of the mapping data for a first distance between the computing device and the destination, in accordance with some embodiments.

FIG. 3 illustrates a display 300 of the mapping data for a first distance between the computing device and the destination. More specifically, FIG. 3 illustrates a computing device displaying map data on a display screen in a three-dimensional view that provides a perspective rendering of the map data. In this example, directions (e.g., driving, walking, public transportation, etc.) along the route 205 to the destination (e.g., destination 215 as shown in FIG. 2) have been received and a first view of the route 205 (e.g., a portion of the route 205) is rendered on the displayed map data. The display 300 illustrated in FIG. 3 includes, among other buildings, three-dimensional buildings 310, 312 and 314 that are rendered on the displayed map data. In this example, the three-dimensional (3D) buildings 310, 312, 314 and 316 are located near the route 205 currently rendered on the displayed map data in the display 300. Further, it can be seen that the 3D building 314 obstructs a portion of the route that is rendered on the displayed map data and a current location of the computing device or user is not shown in FIG. 3.

Figure 4A:
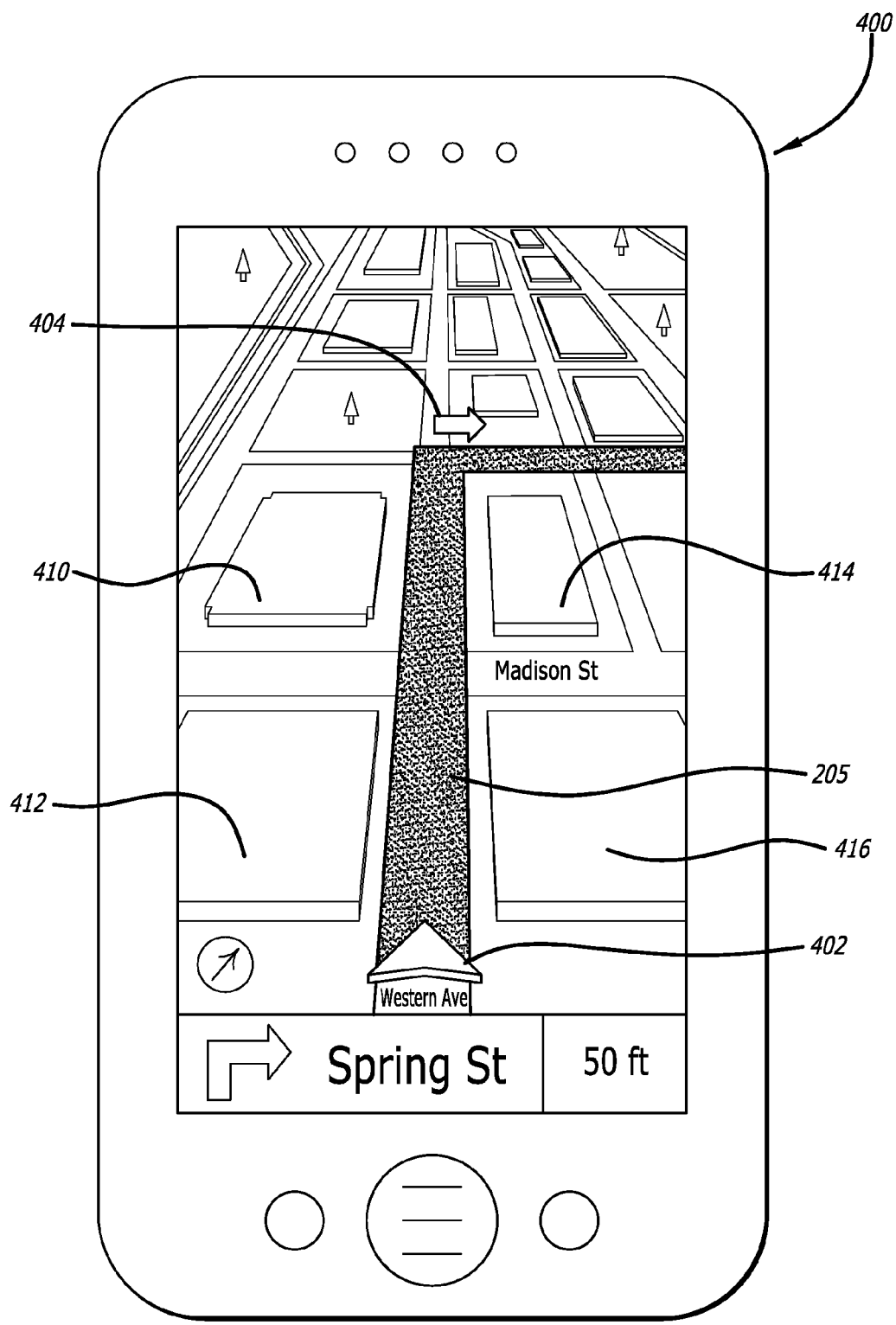
FIG. 4A illustrates a display of the mapping data for a second distance between the computing device and the destination, in accordance with some embodiments.

FIG. 4A illustrates a display 400 of the mapping data for a second distance between the computing device and the destination. More specifically, FIG. 4A illustrates a computing device displaying map data on a display screen in a three-dimensional view that provides a perspective rendering of the map data. A second view of the route 205 (e.g., a portion of the route 205) is rendered on the displayed map data.

As shown in the example of FIG. 4A, a graphical element is displayed corresponding to a current position indicator 402 of the computing device (or user of the computing device). The subject technology in this example has collapsed the 3D buildings 310, 312, 314 and 316 shown in FIG. 3 into buildings 410, 412, 414 and 416, respectively, which reduces the displayed vertical dimensions of the buildings into nearly flat shapes or objects. In some embodiments, the 3D buildings 310, 312, 314 and 316 may be animated to collapse or transition from the shapes of the 3D buildings 310, 312, 314 and 316 into the shapes of the buildings 410, 412, 414 and 416, respectively. As can be seen in FIG. 4A, the buildings 410, 412, 414 and 416 enable the user to have a clear visual view of the portion of the route 205 when compared to the 3D buildings 310, 312, 314 and 316 that may obscure the route 205 as shown in FIG. 3.

Additionally, different ways to visually present the collapsed buildings 410, 412, 414 and 416 are provided. For example, a building(s) on a first side of the route 205 (e.g., the left-hand side) may be rendered in a first color, and a building(s) on a second side of the route 205 (e.g., the right-hand side) may be rendered in a second color for display to emphasize (e.g., draw the user's attention to) or de-emphasize a portion of the route 205 in a visual manner. Moreover, it is appreciated that not all buildings displayed in the map data need to be collapsed in the manner shown in FIG. 4A, and that a selection or subset of buildings may be collapsed while other buildings retain their original 3D shapes.

As further shown in FIG. 4A, a follow-me indicator 404 corresponding to an arrow shaped graphical element emphasizes a direction to turn at a turn location in a portion of the route 205 on the displayed map data. The portion of the route 205 includes a first segment (e.g., in a direction heading to the turn location) and second segment (e.g., in a right-hand direction) that are connected by a turn. The direction to turn may be relative to a travel direction defined by the first segment. The follow-me indicator 404 may be animated to move back and forth, change colors (e.g., flashing) or any other type of animation to further notify the user that a turn on the route is imminent based on the user's current position indicator 402. In one example, the follow-me indicator 404 may be animated to "bounce" or slightly move in a direction of the turn to be made. In the example of FIG. 4A, the navigation arrow, for instance, could be animated to slightly move (e.g., by a few pixels) to the right-hand direction from its original position and then move back in the left-hand direction to its original position and repeat this sequence of movements, without substantially moving away from the original position of the follow-me indicator 404.

Although a straight arrow shape is displayed in the example of FIG. 4A, it is appreciated that other types of graphical elements may be provided for display and still be within the scope of the subject technology. By way of example, a triangle or trapezoidal shape, curved arrow shape, a shape of a vehicle (e.g., car), a shape of a bicycle, shape of a person, shape of an animal, or any other shape may be provided to indicate a direction to turn or represent a location of an upcoming turn or action required along the route.

In some instances, a dynamic graphical element may be used that changes its shape based on the context or an action to be performed along the route. For example, when the upcoming turn is a U-turn, the follow-me indicator 404 may be animated to morph into a U-turn shaped arrow to indicate that a U-turn is required along the route. After the user has made the U-turn, in some embodiments, the U-turn shaped arrow may then animated to morph back into the shape represented by the follow-me indicator 404.

Figure 4B:
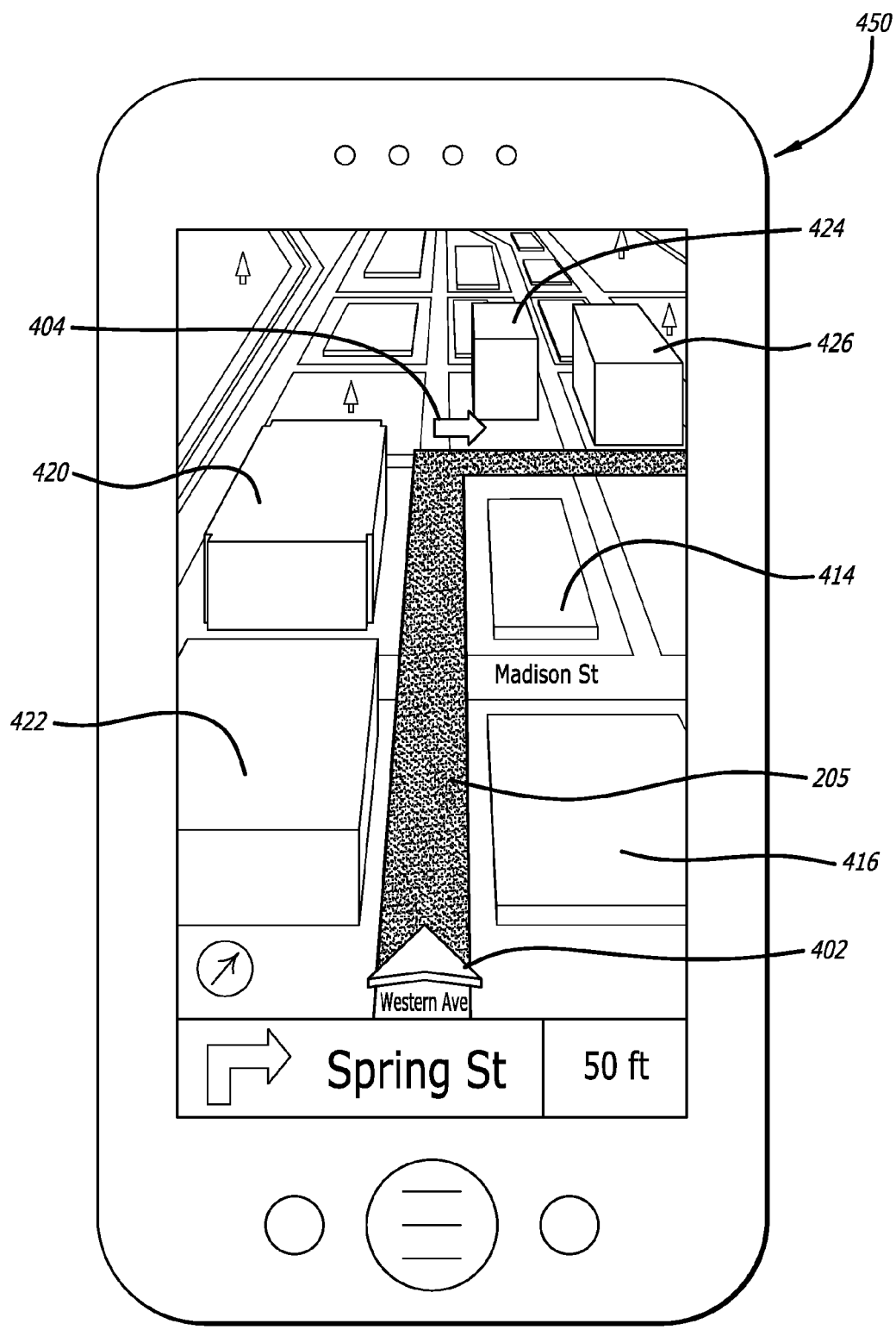
FIG. 4B illustrates a display of the mapping data for a second distance between the computing device and the destination with different renderings of buildings along a portion of the route in view.

FIG. 4B illustrates a display 450 of the mapping data for a second distance between the computing device and the destination with different renderings of buildings along a portion of the route in view. FIG. 4B is similar to FIG. 4A with a difference being a portion of the buildings rendered in the displayed map data using 3D shapes and another portion of the buildings are substantially collapsed in appearance to better highlight a portion(s) of the route currently in view.

As shown, a graphical element is displayed corresponding to the current position indicator 402 of the computing device (or user of the computing device). Buildings 420 and 422 along the left-hand side of the route 205 in view are rendered in 3D shapes, and buildings 424 and 426 further in view are rendered in 3D shapes. As further shown, the 3D buildings 314 and 316 shown in FIG. 3 into buildings 414 and 416, respectively, which reduces the displayed vertical dimensions of the buildings into nearly flat shapes or objects. The follow-me indicator 404 indicates that the user should take a right-hand turn as a next turn along the route 205. In the example of FIG. 4B, the buildings 314 and 316 are selectively rendered as substantially collapsed buildings in order to better highlight or indicate the portion of the route where the next turn (e.g., the upcoming right-hand turn) along the route 205 is to be made. Thus, buildings that are on a different or opposite side from the next turn may be rendered in 3D while buildings on the same side of the next turn are rendered as substantially collapsed buildings.

Figure 5:
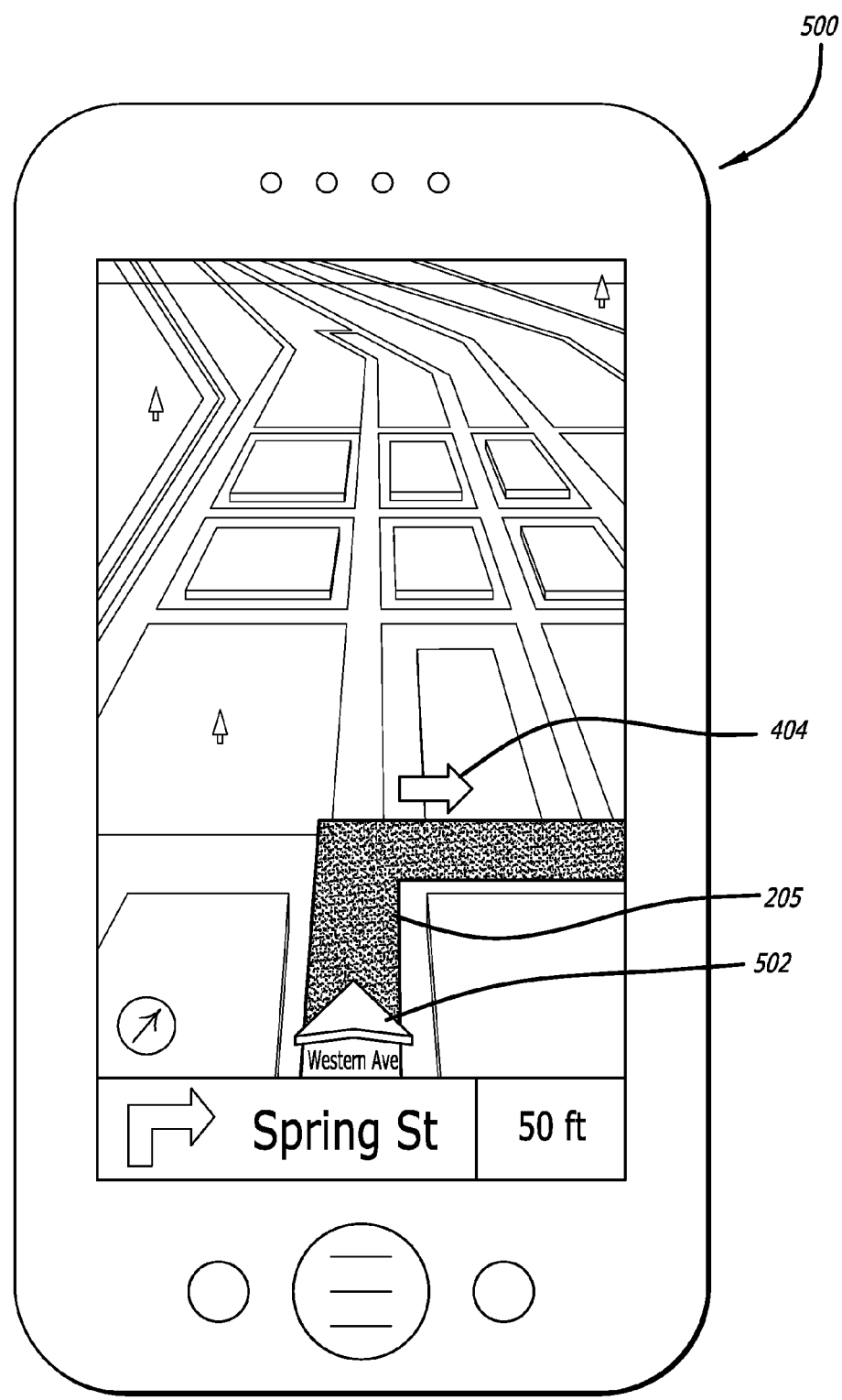
FIG. 5 illustrates a display of the mapping data for a third distance between the computing device and the destination, in accordance with some embodiments.

FIG. 5 illustrates a display 500 of the mapping data for a third distance between the computing device and the destination. More specifically, FIG. 5 illustrates a computing device displaying map data on a display screen in a three-dimensional view that provides a perspective rendering of the map data. A third view of the route 205 (e.g., a portion of the route 205) is rendered on the displayed map data, which includes one or more collapsed buildings near the route 205 as described by example in FIG. 4A above.

As the user/computing device progresses along the route 205, and the distance between the user's current location and the destination decreases (or increases, etc.), the display of mapping data can update to show the progression along the route accordingly. As an example, FIG. 5 illustrates another view of the map data, updated to reflect the new current location. In this example, a graphical element corresponding to a current location 502 is closer to a turn along the route 205 as indicated by the follow-me indicator 404. A graphical element corresponding to the user's current location may be animated, substantially in real-time, to move along the route 205 as the user makes further progress along the route 205 and the graphical element may be rendered on the current view of the mapping data to reflect the current location of the user.

It is appreciated that the graphical element corresponding to the user's current location may include other visual presentations. In one embodiment, the graphical element of the current location may indicate the progress along the route 205 through a visual manner. For example, the graphical element may be progressively filled in with a different color to indicate the user's progress along the route. In another example, a visual indicator, such as text or an icon indicating a percentage of the total traveled portion of the route 205 until reaching the destination (e.g., 30%, 50%, 75%, etc.) is provided and rendered in a position substantially adjacent to the graphical element of the current location, on the graphical element of the current location itself, or somewhere along the portion of the route 205 currently in view. Further, in some embodiments, the graphical element of the current location may change colors (e.g., from black to red) as the user or computing device gets closer to the destination or an upcoming turn.

Figure 6:
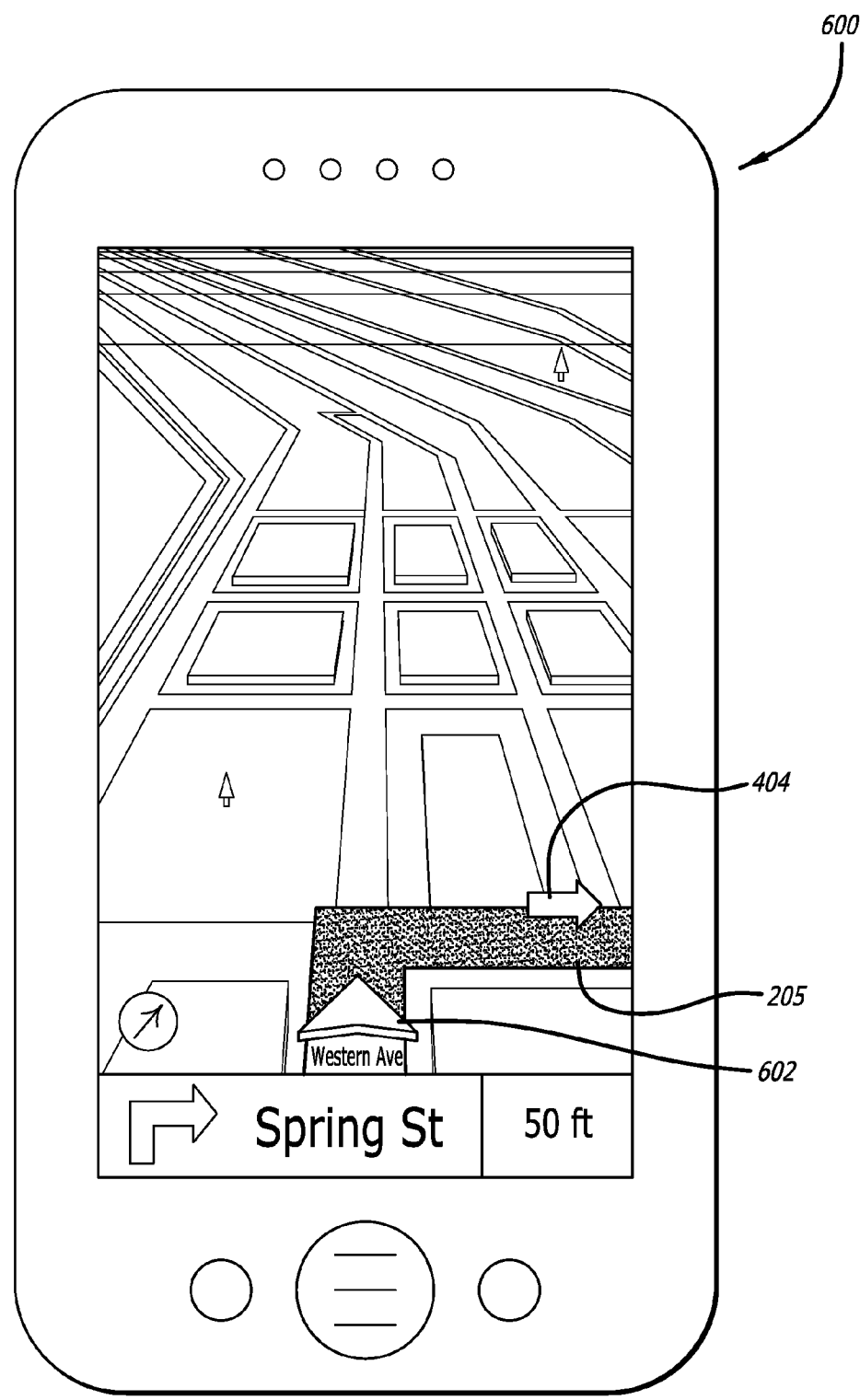
FIG. 6 illustrates a display of the mapping data for a fourth distance between the computing device and the destination, in accordance with some embodiments.

FIG. 6 illustrates a display 600 of the mapping data for a fourth distance between the computing device and the destination. More specifically, FIG. 6 illustrates a computing device displaying map data on a display screen in a three-dimensional view that provides a perspective rendering of the map data. A fourth view of the route 205 (e.g., a portion of the route 205) is rendered on the displayed map data, which includes one or more collapsed buildings near the route 205.

As shown, when a graphical element corresponding to a current location 602 is within a distance threshold of the turn along the route 205, the follow-me indicator 404 is animated in order to move in the direction of the turn to provide a visual indication of the direction of the turn. In one example, a distance between a GPS location of the current location 602 and a GPS location of the turn (e.g., as designated by the mapping application) is determined and compared to the distance threshold. In the example of FIG. 6, the follow-me indicator 404 indicates that the user should take a right turn onto the upcoming street by moving, via being animated, along the route in a right direction and eventually disappearing from the view of mapping data shown in FIG. 6. The follow-me indicator 404 may continue to follow, via being animated, the route 205 to a determined location of a next turn to be made along the route 205. The follow-me indicator 404, in some embodiments may then be rendered as remaining stationary at a location of a next turn along the route 205 as further discussed in FIG. 7 below.

It is appreciated that the aforementioned distance threshold could be specified in various ways. In one embodiment, the distance threshold could be a predetermined value (e.g., ¹⁄₁₀ of a mile) from a distance to an intersection of two respective streets where the turn is to be made. As discussed before, the distance to the turn may be determined using a GPS location of the current location of the computing device to a GPS location of the turn. Alternatively, the distance threshold could vary, according to a determination function or other formula, for example, as a result of the distance between the current location of a current position indicator (e.g., the current position indicator 402) (e.g., a GPS location) and the intersection (e.g., a GPS location of the turn to be made on the route). In another embodiment, the distance threshold could be determined according to a zoom or scale factor of the view of the mapping information where the distance threshold is a lesser value when the zoom or scale factor of the view is greater (e.g., more zoomed in) and a greater value when the zoom or scale factor is lesser (e.g., more zoomed out).

Figure 7:
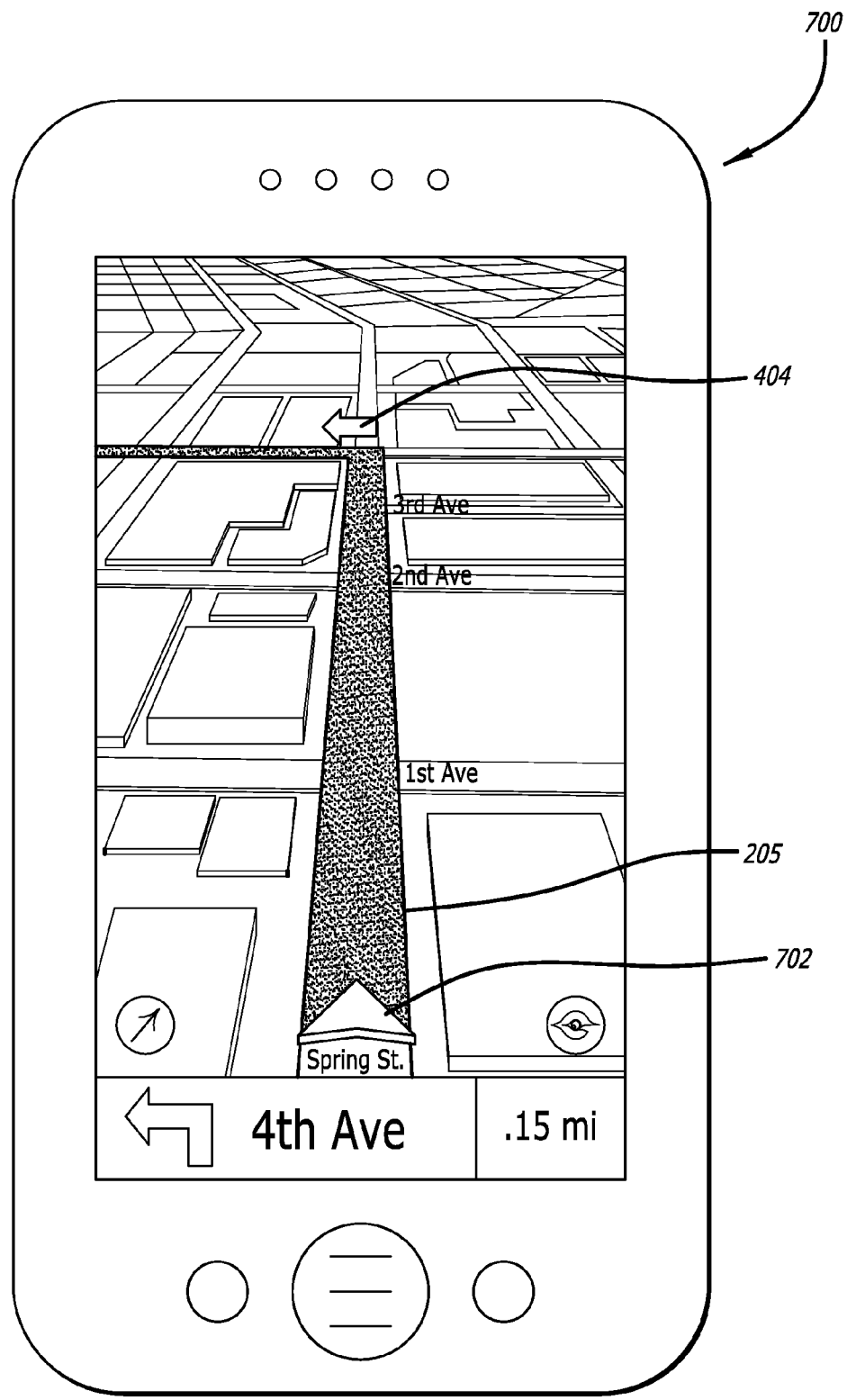
FIG. 7 illustrates a display of the mapping data for a fifth distance between the computing device and the destination after the user has made further progress on the route (e.g., by making a turn) from the previous location in FIG. 6, in accordance with some embodiments.

FIG. 7 illustrates a display 700 of the mapping data for a fifth distance between the computing device and the destination. More specifically, FIG. 7 illustrates a computing device displaying map data on a display screen in a three-dimensional view that provides a perspective rendering of the map data. A fifth view of the route 205 (e.g., a portion of the route 205) is rendered on the displayed map data after the user has made the right-hand turn as discussed in FIG. 6, which includes one or more collapsed buildings near the route 205.

In FIG. 7, the user is at a current location 702 (as represented by a graphical element) on the route 205. In this example, the follow-me indicator 404 is at a location corresponding to a left-hand turn along the route 205 to emphasize the direction to turn. The portion of the route 205 as shown in FIG. 7 includes the second segment (as discussed in FIG. 4A and heading toward the turn location) and a third segment (e.g., away from the left-hand turn) that are connected by a respective turn (e.g., the next turn in the route 205). By reference to FIG. 6, after the user has made the right-hand turn, the follow-me indicator 404 may be animated to move along the route 205 to the location shown in FIG. 7 to indicate that a left-hand turn is upcoming. In the example of FIG. 7, the follow-me indicator 404 may remain stationary until the current location of the user reaches a distance threshold to the location of the left-hand turn (e.g., an intersection of two respective streets shown in FIG. 7).

Figure 8:
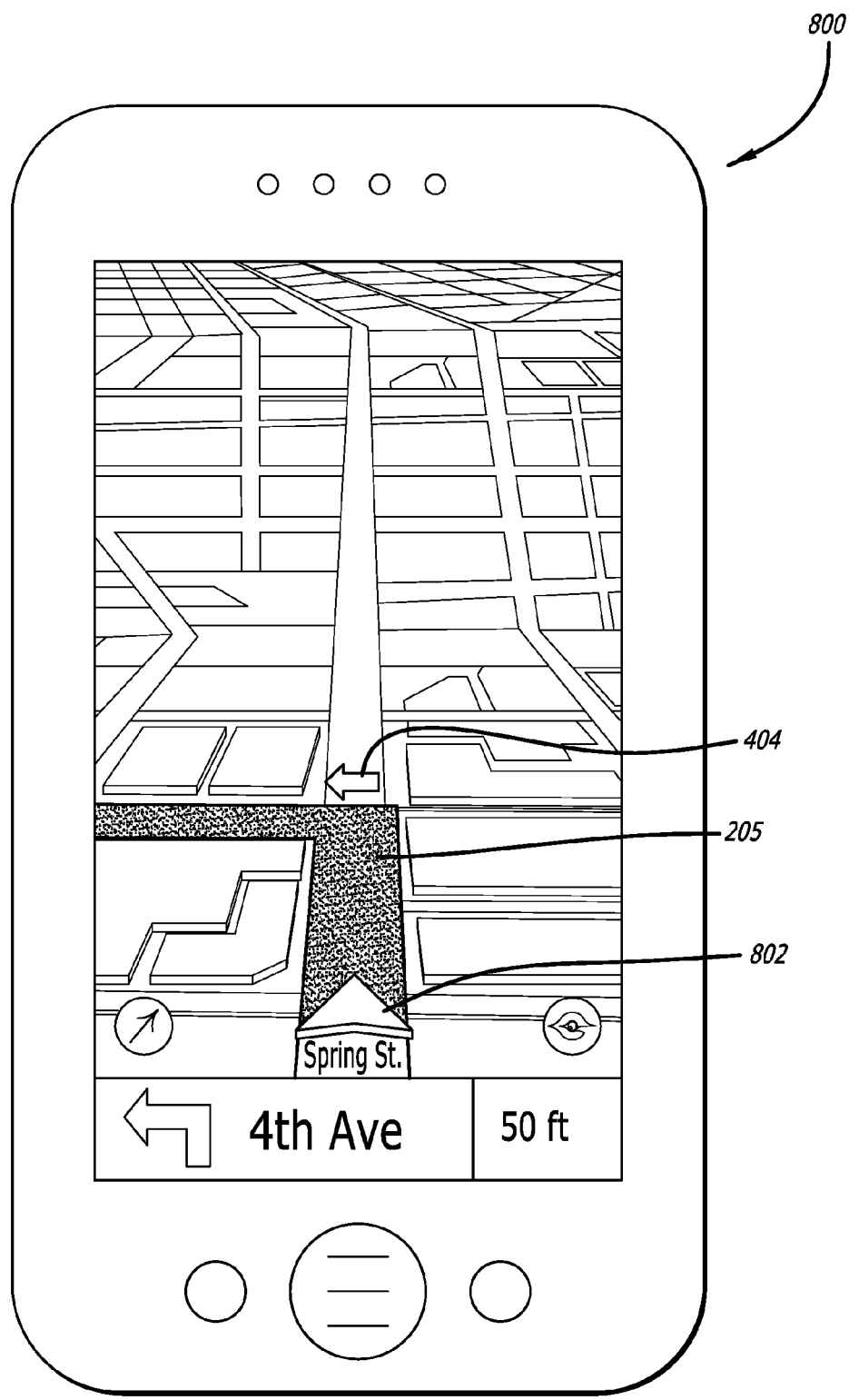
FIG. 8 illustrates a display of the mapping data for a sixth distance between the computing device and the destination, in accordance with some embodiments.

FIG. 8 illustrates a display 800 of the mapping data for a sixth distance between the computing device and the destination. More specifically, FIG. 8 illustrates a computing device displaying map data on a display screen in a three-dimensional view that provides a perspective rendering of the map data. A sixth view of the route 205 (e.g., a portion of the route 205) is rendered on the displayed map data after the user has made further progress on the route 206 from the previous location of the user as discussed in FIG. 7, which includes one or more collapsed buildings near the route 205.

Figure 9:
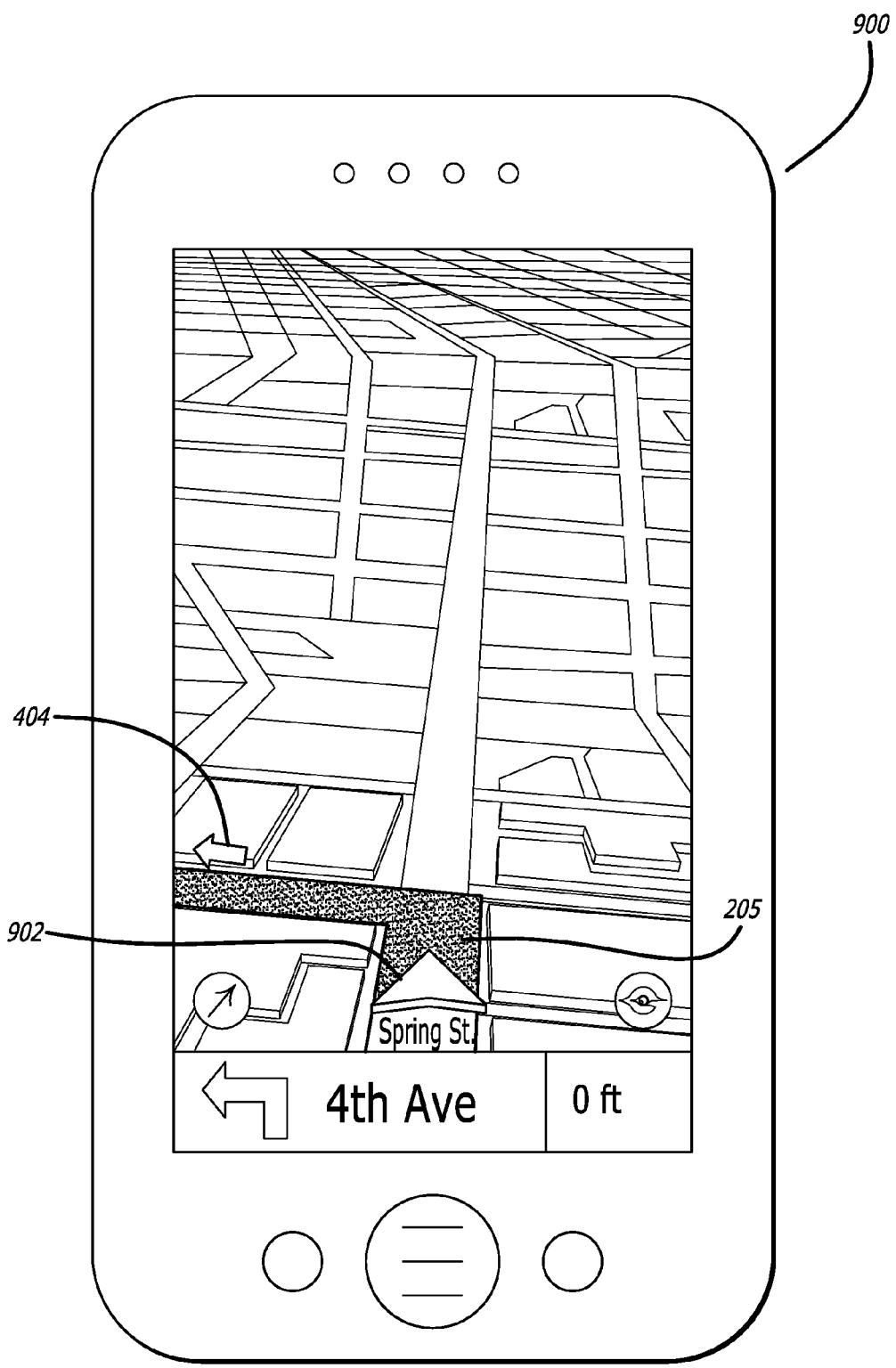
FIG. 9 illustrates a display of the mapping data for a seventh distance between the computing device and the destination, in accordance with some embodiments.

As shown in FIG. 8, a graphical element corresponding to a current location 802 of the user is closer to the location of the follow-me indicator 404. FIG. 9 illustrates a display 900 of the mapping data for a seventh distance between the computing device and the destination after the user has made further progress on the route 205 from the previous location in FIG. 8. In the example of FIG. 9, the user's current location is within a distance threshold of the location of the turn to be made along the route 205. As discussed before, the distance threshold may be determined in various ways including being based on a distance from the turn location and the current location of the current position indicator 902. As shown in FIG. 9, in response to the user's current location being within the distance threshold, the follow-me indicator 404 may be animated to move along the direction of the upcoming left-hand turn to indicate a direction of the route 205 that instructs, in a visual manner, the user to follow in order to continue further progress along the route 205. In this example, the follow-me indicator 404, as it is being animated to move along the route 205, will eventually disappear from the view of the displayed map data and move to another location along the route 205.

Figure 10:
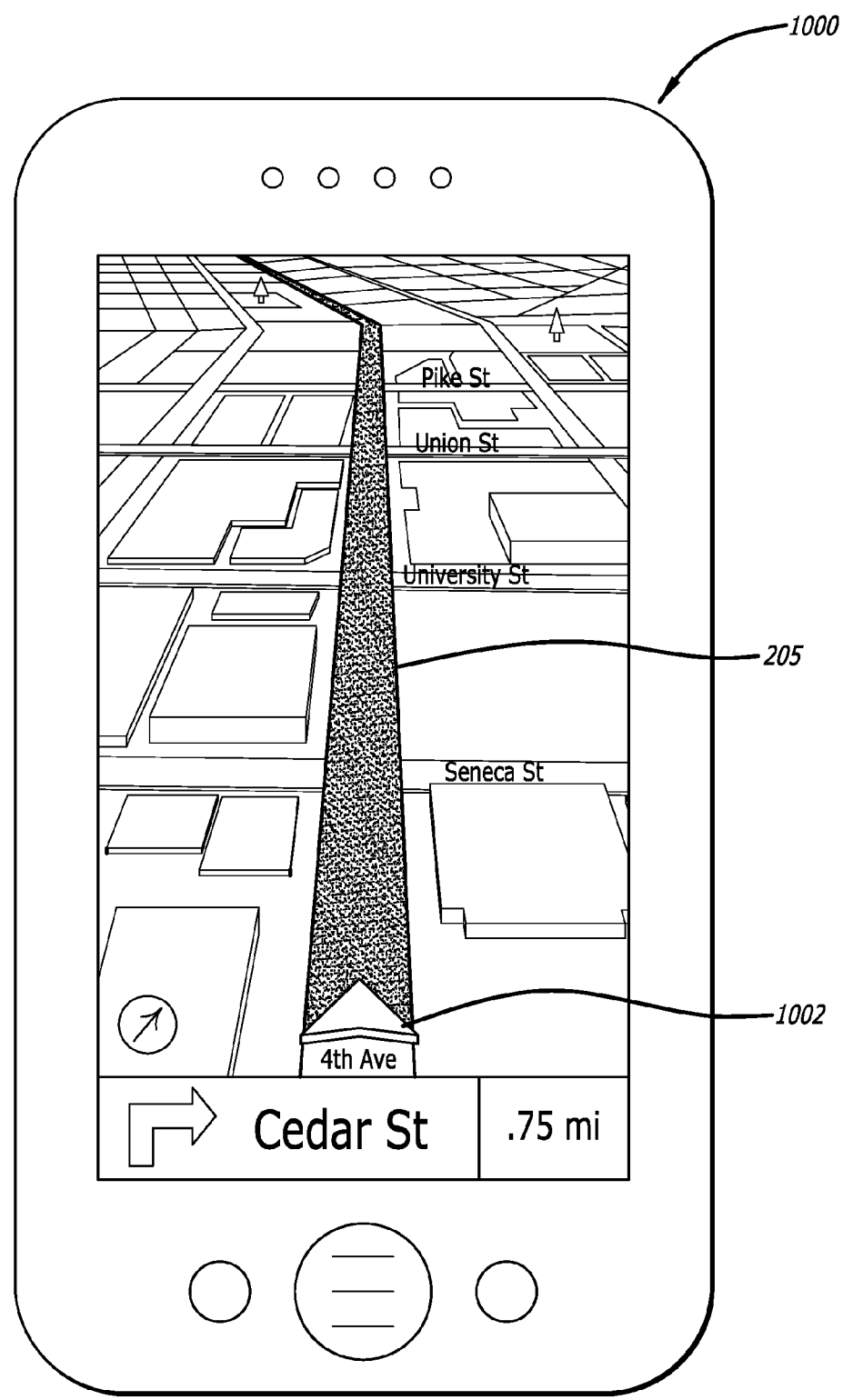
FIG. 10 illustrates a display of the mapping data for an eighth distance between the computing device and the destination after the user has made further progress (e.g., by making a turn) on the route from the previous location in FIG. 9, in accordance with some embodiments.

FIG. 10 illustrates a display 1000 of the mapping data for an eighth distance between the computing device and the destination. An eighth view of the route 205 (e.g., a portion of the route 205) is rendered on the displayed map data after the user has made the left-hand turn from the previous location of the user as discussed in FIG. 9, which includes one or more collapsed buildings near the route 205.

In the example of FIG. 10, the navigation arrow is not rendered on the displayed mapping data as a location of a next turn is beyond the view of the route 205 from the distance of a graphical element corresponding to a current location 1002. The follow-me indicator 404, however, may be animated to move along the portion of the route 205 shown in FIG. 10 so that the user may momentarily see the movement of the follow-me indicator 404 until traveling beyond the top portion of the view of mapping data currently displayed. Alternatively, the navigation arrow may be provided for display in a top portion of the view of the route 205 to indicate a next turn (e.g., a right-hand turn in 0.75 miles as shown in FIG. 10). As similarly described before, the user may make further progress on the route 205 and the current location 1002 of the user may be updated substantially in real-time according to the progress.

Figure 11:
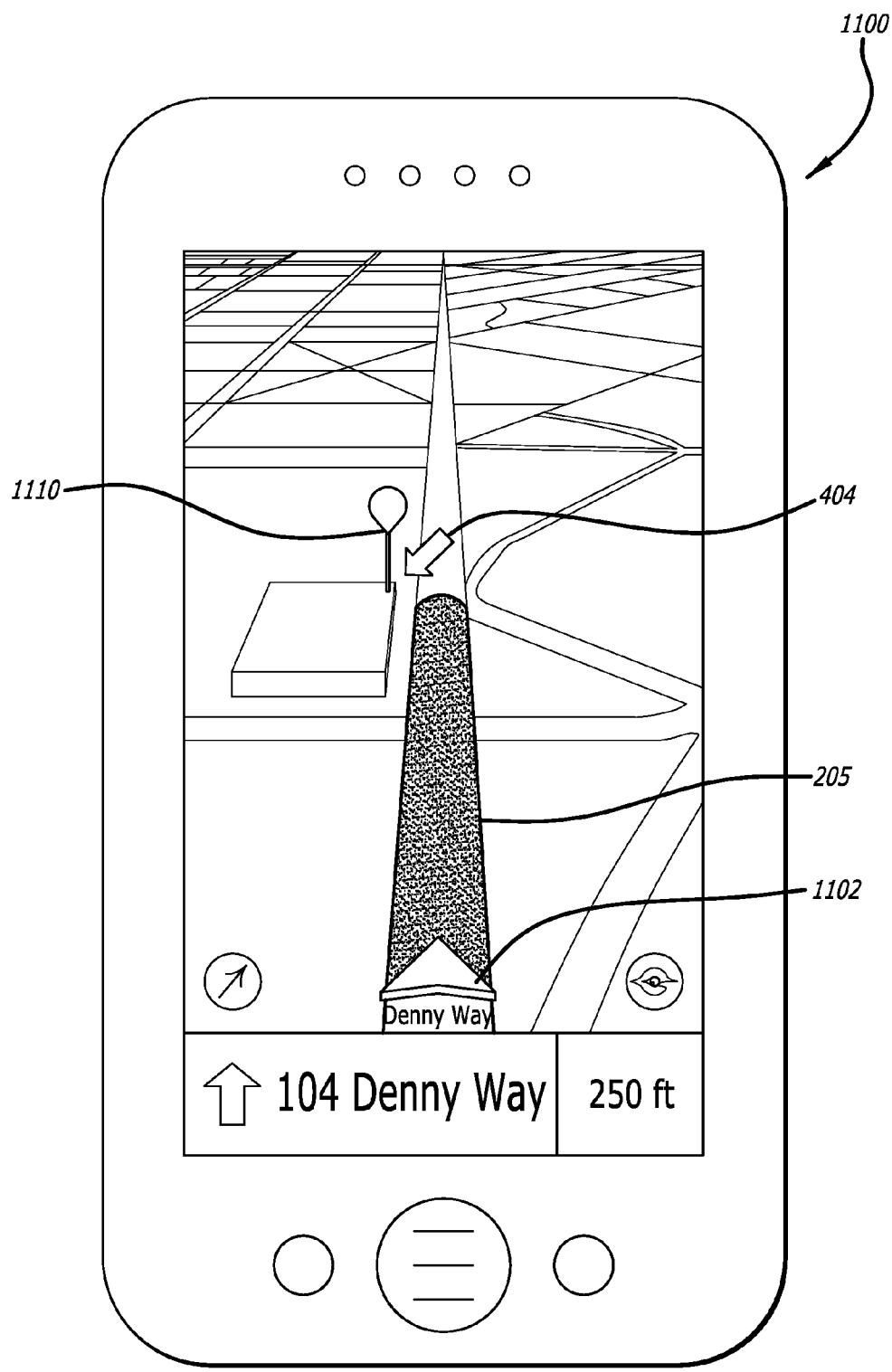
FIG. 11 illustrates a display of the mapping data for a ninth distance between the computing device and a destination which is now rendered on the displayed mapping data, in accordance with some embodiments.

FIG. 11 illustrates a display 1100 of the mapping data for a ninth distance between the computing device and a destination 1110 which is now rendered on the displayed mapping data. A ninth view of the route 205 (e.g., a portion of the route 205) is rendered on the displayed map data after the user has made the right-hand turn mentioned in the discussion of FIG. 10, which includes one or more collapsed buildings near the route 205. By reference to FIG. 2, the destination 1110 corresponds to the destination 215 shown in FIG. 2.

In this example, the user is at a current location 1102 (as indicated by a graphical element) and the follow-me indicator 404 indicates the location of the destination 1110 (e.g., by pointing down to the location of the destination 1110) that is shown as a pin-shaped graphical element in the displayed mapping data. In this manner, the follow-me indicator 404 provides another visual indication to the user regarding the location of the destination 1110. In at least one embodiment, however, the follow-me indicator 404 may not be rendered on the displayed mapping data of FIG. 11. Further, in some embodiments, the follow-me indicator 404 may disappear upon the user's location reaching the location of the destination 1110 as described below.

Figure 12:
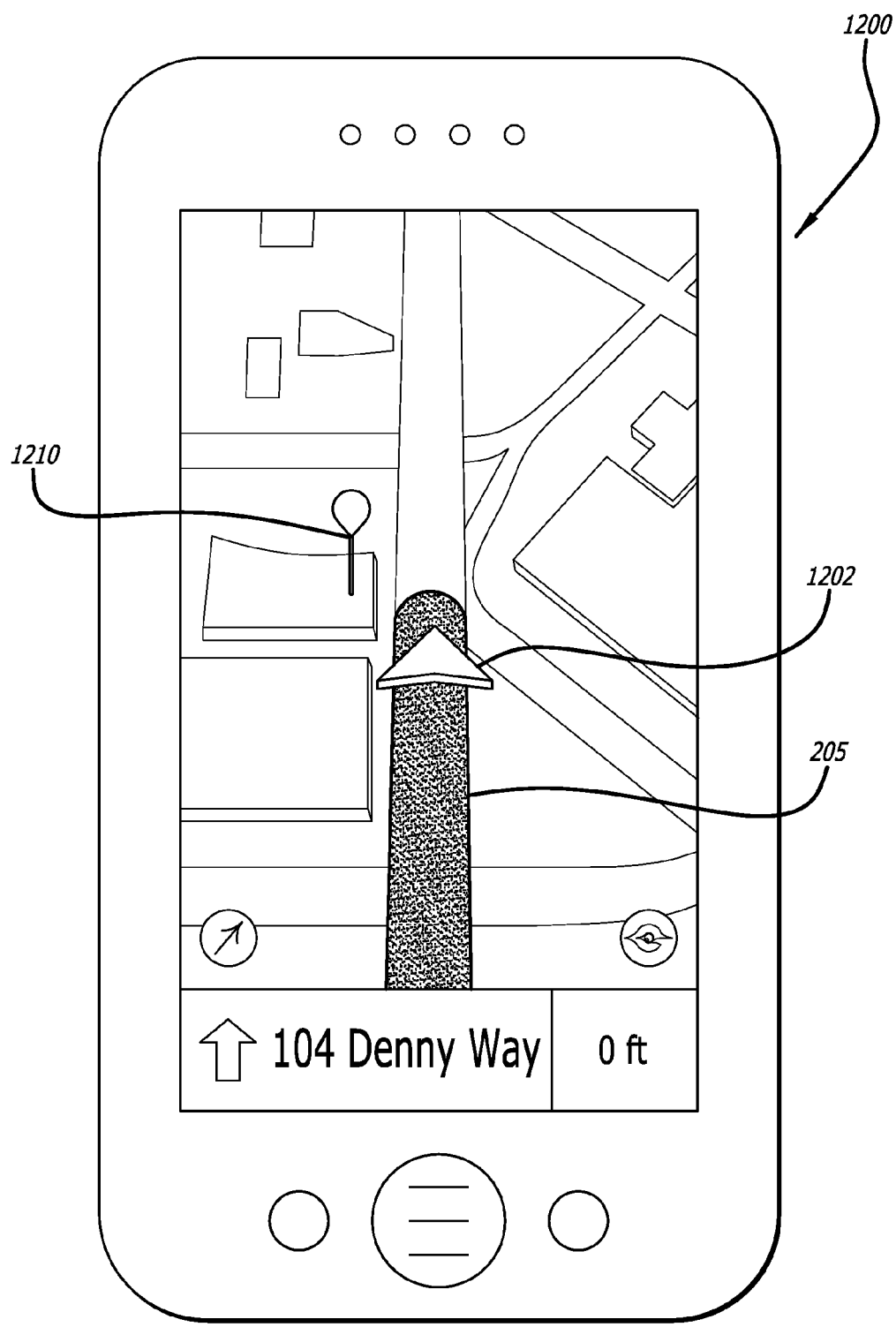
FIG. 12 illustrates a display of the mapping data for when the computing device has reached a destination, in accordance with some embodiments.

FIG. 12 illustrates a display 1200 of the mapping data for when the computing device has reached a destination. A tenth view of the route 205 (e.g., a portion of the route 205) is rendered on the displayed map data after the user has reached a destination 1210 that is shown as a pin-shaped graphical element in the displayed mapping data. A graphical element corresponding to the user's current location 1202 is shown in FIG. 12. By reference to FIGS. 2 and 11, the destination 1210 corresponds to the destination 1110 in FIG. 11 and the destination 215 in FIG. 2. In the example of FIG. 12, the navigation arrow is not provided in the view of the displayed mapping since the user has reached the destination 1210 (and no other subsequent turn(s) are required in the route 205 to reach the destination 1210).

Although the aforementioned examples describe a mapping application that is operating in a turn-by-turn navigation mode, in some embodiments, the mapping application may provide different operating modes for presenting the map data for a given route. For example, a step-by-step operating mode may be provided where a user may swipe, or perform a type of gesture motion on a touch-sensitive display screen of the computing device, to look forward (e.g., view the next turn) on a route to get a sense of an upcoming turn(s) or action(s) on the route that are beyond the user's current location. The mapping application in this mode would provide a view of the map data including the next or upcoming turn on the route in a 2D view (e.g., top-down or flat view). In the step-by-step operating mode, the aforementioned follow-me indicator 404 (or other type of graphical element to represent an upcoming turn) may be rendered, in the 2D view, to represent the upcoming turn or action in the 2D view; however, the user's or computing device's current location (and the graphical element representing the user's current location) would not be in view in the step-by-step mode.

FIGS. 13A and 13B illustrate example processes for displaying mapping information that can be used in accordance with some embodiments. While the example processes 1300 and 1350 are illustrated with a particular order of steps, those of ordinary skill in the art will appreciate that FIGS. 13A and 13B and the steps illustrated therein can be executed in parallel (e.g., at the same time) or in any order that accomplishes the technical advantages of the present disclosure and can include fewer or more steps than illustrated.

Each block shown in FIGS. 13A and 13B may represent one or more processes, methods or subroutines, carried out in the example processes of FIG. 13A or 13B. The steps illustrated in FIGS. 13A and 13B can be implemented in a system including a mobile electronic device, such as a smartphone, a tablet computer, or any other electronic device configured to capture images. In at least one example, the processes illustrated in FIGS. 13A and 13B can be implemented in scripting language associated with or embedded in a webpage. In some embodiments, the flow chart illustrated in FIGS. 13A and 13B may be performed by the computing device 102 illustrated in FIG. 1. Moreover, it is appreciated that the steps in FIGS. 13A and 13B may be performed conjunctively with each other.

At step 1302 in FIG. 13A, a request for a route from a current location to a destination location is received. At step 1304, map data is obtained corresponding to a route from the current location to the destination location. The route, as discussed before, may include at least a first segment and a second segment that are connected by a turn. At step 1306, using the map data, a portion of the route to be displayed including building(s) near to the portion of the route are determined. At step 1308, a 3D map image is generated that includes the portion of the route including substantially collapsed building(s) near the route, a first graphical element (e.g., the current position indicator discussed above) corresponding to the current location, and a second graphical element (e.g., the follow-me indicator discussed above) indicating a turn to be made on the route. At step 1310, the 3D map image, the first graphical element and the second graphical element are provided for display.

At step 1352 in FIG. 13B, information regarding progress along the route is obtained. At step 1354, the progress along the route is determined to be within a distance threshold from a turn location of a turn to be made along the route. At step 1356, the second graphical element is animated to move in the direction of the turn. At step 1358, the second graphical element is animated to follow the route to a location of a subsequent turn (e.g., next turn) to be made along the route and remain stationary at the location (or be animated as discussed before) of the subsequent turn or next turn. At step 1360, based on the obtained progress, a new 3D map image is generated including a graphical element of a new current location (e.g., the current position indicator discussed above) and a second graphical element (e.g., the follow-me indicator discussed above) at the turn location of the subsequent or next turn to be made. At step 1362, the new 3D map image is then provided for display.

Figures 14A, 14B:
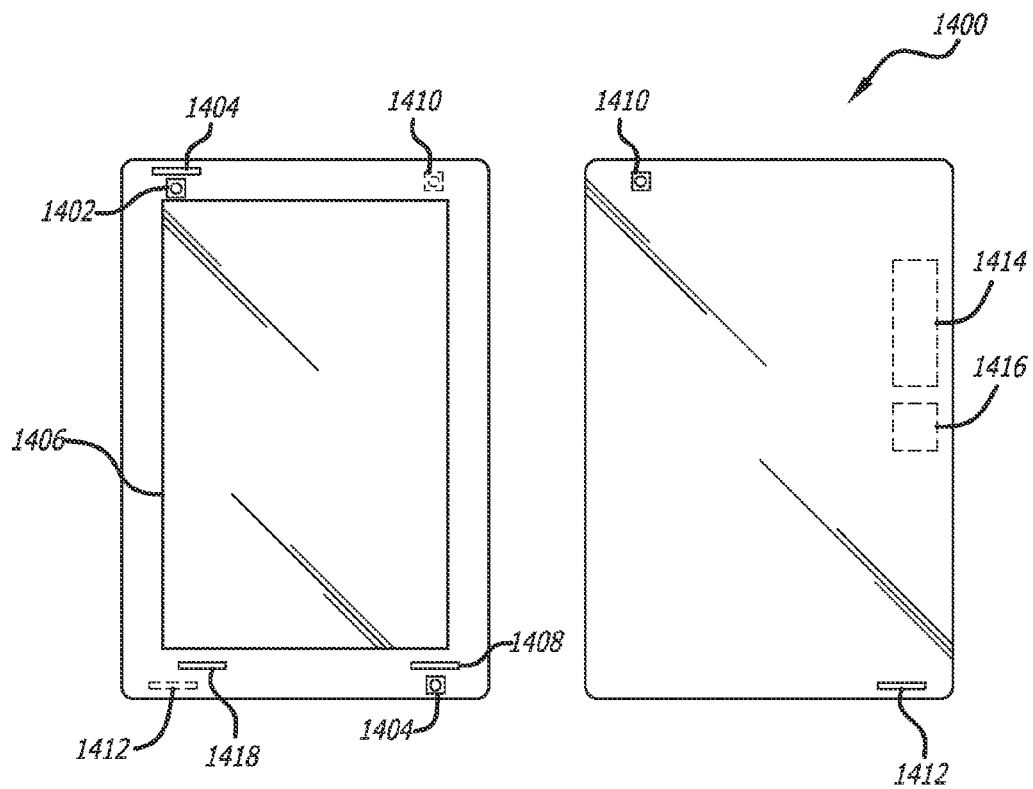
FIGS. 14A and 14B illustrate an example computing device that can be used to implement aspects of various embodiments.

FIGS. 14A and 14B illustrate front and back views, respectively, of an example electronic computing device 1400 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1400 has a display screen 1406 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1402 on the front of the device and at least one image capture element 1410 on the back of the device. It should be understood, however, that image capture elements could also, or alternatively, be placed on the sides or corners of the device, and that there can be any appropriate number of capture elements of similar or different types. Each image capture element 1404 and 1410 may be, for example, a camera, a charge-coupled device (CCD), a motion detection sensor or an infrared sensor, or other image capturing technology.

As discussed, the device can use the images (e.g., still or video) captured from the imaging elements 1404 and 1410 to generate a three-dimensional simulation of the surrounding environment (e.g., a virtual reality of the surrounding environment for display on the display element of the device). Further, the device can utilize outputs from at least one of the image capture elements 1404 and 1410 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1408 on the front side, one microphone 1412 on the back, and one microphone 1404 on or near a top or side of the device. In some devices there may be only one microphone, while in other devices there might be at least one microphone on each side and/or corner of the device, or in other appropriate locations.

The device 1400 in this example also includes one or more orientation- or position-determining elements 1418 operable to provide information such as a position, direction, motion, or orientation of the device. These elements can include, for example, accelerometers, inertial sensors, electronic gyroscopes, and electronic compasses.

The example device also includes at least one computing mechanism 1414, such as may include at least one wired or wireless component operable to communicate with one or more electronic devices. The device also includes a power system 1416, such as may include a battery operable to be recharged through conventional plug-in approaches, or through other approaches such as capacitive charging through proximity with a power mat or other such device. Various other elements and/or combinations are possible as well within the scope of various embodiments.

Figure 15:
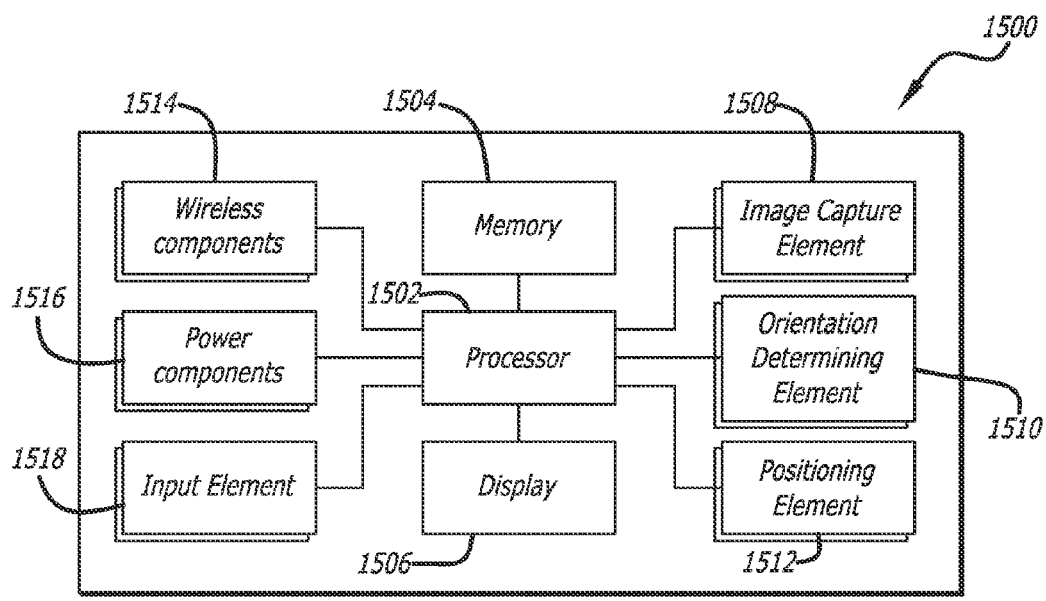
FIG. 15 illustrates example components that can be used with a device such as that illustrated in FIGS. 14A and 14B.

FIG. 15 illustrates a set of basic components of an electronic computing device 1500 such as the device 1400 described with respect to FIGS. 14A and 14B. In this example, the device includes at least one processing unit 1502 for executing instructions that can be stored in a memory device or element 1504. As would be apparent to one of ordinary skill in the art, the device can include many types of memory, data storage, or computer-readable media, such as a first data storage for program instructions for execution by the processing unit(s) 1502, the same or separate storage can be used for images or data, a removable memory can be available for sharing information with other devices, and any number of computing approaches can be available for sharing with other devices.

The device typically will include some type of display element 1506, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1508, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1500 also includes at least one orientation determining element 1510 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1500. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1512 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1514 operable to communicate with one or more electronic devices within a computing range of the particular wireless channel. The wireless channel can be any appropriate channel used to enable devices to communicate wirelessly, such as BLUETOOTH, cellular, NFC, or WI-FI channels. It should be understood that the device can have one or more conventional wired communications connections as known in the art.

The device also includes a power system 1516, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1518 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or BLUETOOTH or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 16:
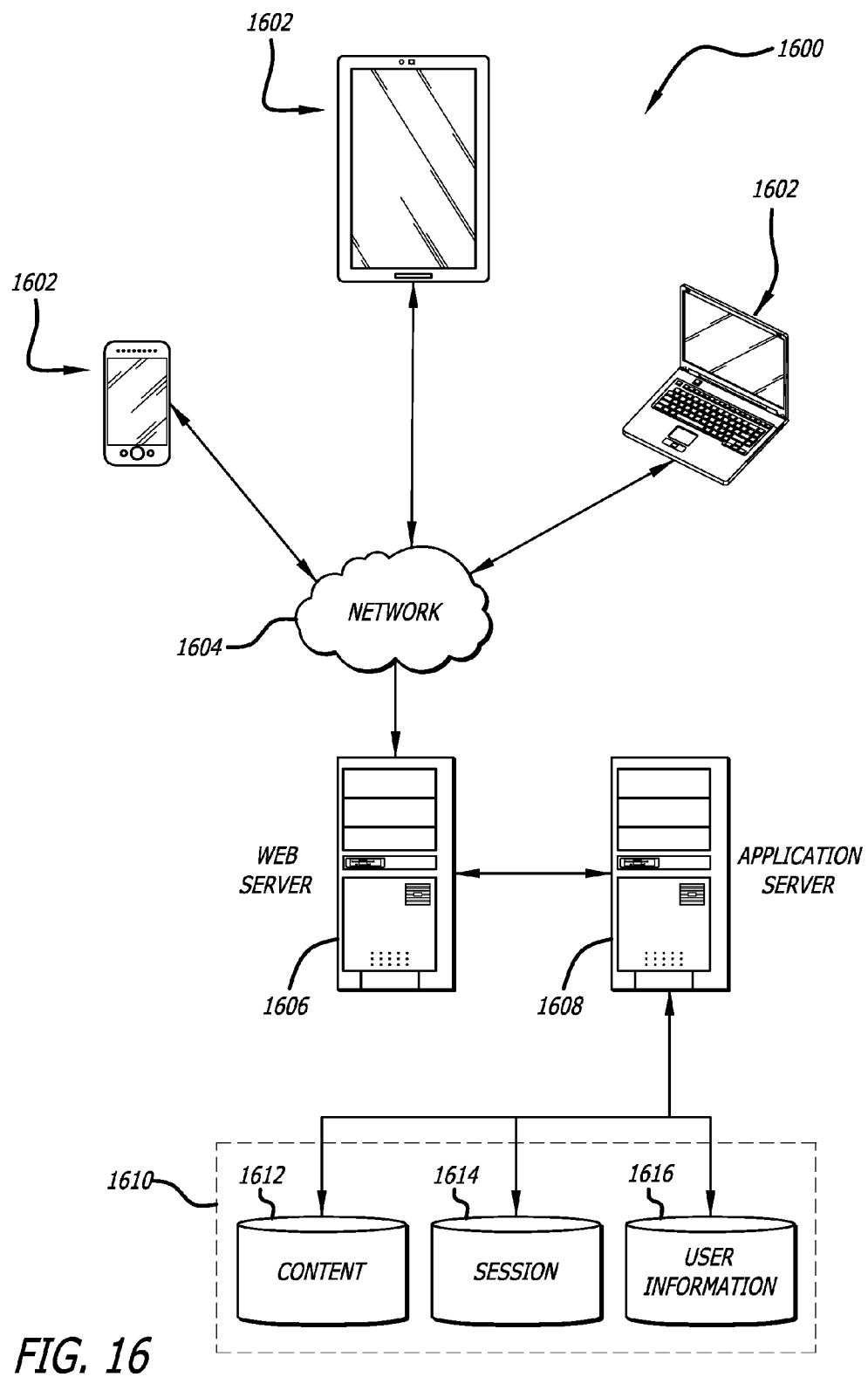
FIG. 16 illustrates an environment in which various embodiments can be implemented.

As discussed, different approaches can be implemented in various environments in accordance with the described embodiments. For example, FIG. 16 illustrates an example of an environment 1600 for implementing aspects in accordance with various embodiments. As will be appreciated, although a Web-based environment is used for purposes of explanation, different environments may be used, as appropriate, to implement various embodiments. The system includes electronic client devices 1602, which can include any appropriate device operable to send and receive requests, messages or information over an appropriate network 1604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 1606 for receiving requests and serving content in response thereto, although for other networks, an alternative device serving a similar purpose could be used, as would be apparent to one of ordinary skill in the art.

The illustrative environment includes at least one application server 1608 and a data store 1610. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1608 can include any appropriate hardware and software for integrating with the data store 1610 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1606 in the form of HTML, XML or another appropriate structured language in this example. The handling of all requests and responses, as well as the delivery of content between the client device 1602 and the application server 1608, can be handled by the Web server 1606. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing content (e.g., production data) 1612 and user information 1616, which can be used to serve content for the production side. The data store is also shown to include a mechanism for storing log or session data 1614. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, JAVA servers, and business application servers. The server(s) also may be capable of executing programs or scripts in response requests from user devices, such as by executing one or more Web applications that may be implemented as one or more scripts or programs written in any programming language, such as JAVA®, C, C# or C++, or any scripting language, such as PERL, PYTHON, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A system, comprising:
  at least one processor; and
  memory including instructions that, when executed by the at least one processor, cause the system to:
    obtain map data corresponding to a route from a current location of a user to a destination location, the route including at least a first segment and a second segment connected by a turn;
    determine a turn location of the turn, the turn location having an associated latitude and longitude coordinate pair;
    generate, using the map data, a map image to be displayed, the map image including visual representations of:

the first segment,
  a current position indicator corresponding to the current location on the map image,
  at least a portion of the second segment, and
  a follow-me indicator corresponding to the turn at the turn location, the follow-me indicator comprising an arrow shape indicating a turn direction, the turn direction being relative to a travel direction defined by the first segment;
obtain information regarding progress of the current position indicator along the first segment;
determine that the progress of the current position indicator along the first segment is within a distance threshold from the turn location of the turn to be made along the route, the distance threshold being measured as a distance from the turn location and the current position indicator; and
animate for display the follow-me indicator to indicate the turn, the follow-me indicator being disconnected from the current position indicator, wherein, in response to the current position indicator being within the distance threshold, the follow-me indicator moves along the route to another location along the route and disappears from a view of displayed map image.

2. The system of claim 1, wherein the instructions further cause the at least one processor to:
determine a second turn location of a second turn along the route, the second turn connecting the second segment and a third segment of the route;
generate, using the map data, a second map image to be displayed, the second map image including visual representations of:
  the second segment,
  the current position indicator corresponding to the current location on the second map image,
  at least a portion of the third segment, and
  the follow-me indicator corresponding to the second turn at the second turn location, the follow-me indicator comprising the arrow shape indicating a second turn direction, the second turn direction being relative to a second travel direction defined by the second segment;
obtain information regarding progress of the current position indicator along the second segment;
determine that the progress of the current position indicator along the second segment is within a second distance threshold from the second turn location of the second turn to be made along the route, the second distance threshold being measured as a second distance from the second turn location and the current position indicator; and
animate for display the follow-me indicator to move in the second turn direction of the second turn and then, in response to the current position indicator being within the distance threshold, move to at least the portion of the third segment along the route.

3. The system of claim 1, wherein to generate, using the map data, the map image including visual representations further causes the at least one processor to:
generate, using the map data, a three-dimensional (3D) map image to be displayed, the 3D map image including visual representations of one or more buildings near the first segment and the second segment of the route as buildings that are substantially collapsed in appearance; and
provide the 3D map image including the one or more buildings near the first segment and the second segment of the route, the current position indicator and the follow-me indicator for display.

4. A computer-implemented method, comprising:
determining a route, the route being from a first location to a second location and the route including at least one turn;
causing a follow-me indicator emphasizing the turn to be displayed;
causing a current location graphical element to be displayed;
determining the current location graphical element is within a distance threshold of the turn; and
animating for display the follow-me indicator to indicate the turn, the follow-me indicator being disconnected from the current location graphical element, wherein, in response to the current location graphical element being within the distance threshold, the follow-me indicator moves along the route to another location along the route and disappears from a view of displayed map data.

5. The computer-implemented method of claim 4, further comprising:
determining a next turn location of the next turn on the route; and
causing the current location graphical element to move along the route up to a next turn location, and then remain stationary at the next turn location of the next turn.

6. The computer-implemented method of claim 4, wherein the follow-me indicator comprises an arrow-shaped object.

7. The computer-implemented method of claim 6, further comprising dynamically changing shape of the current location graphical element depending on an action to be performed along the route.

8. The computer-implemented method of claim 4, further comprising:
predetermining the distance threshold as a fixed distance from the turn on the route, or
determining, based at least partially on a current zoom level of the route, the distance threshold as a distance from the current location to the turn.

9. The computer-implemented method of claim 4, further comprising:
causing one or more buildings near the route to be displayed, the one or more buildings being displayed as substantially collapsed buildings.

10. The computer-implemented method of claim 9, wherein the substantially collapsed buildings include at least one building that is substantially adjacent to a portion of the route.

11. The computer-implemented method of claim 4, further comprising:
obtaining information regarding progress along the route, the route including a set of segments;
determining an updated distance to the second location;
updating a portion of the set of segments of the route to be displayed; and
providing the updated portion of the set of segments of the route to be displayed.

12. The computer-implemented method of claim 11, further comprising:
animating substantially in real-time, based at least in part on the obtained progress, a respective current location graphical element, corresponding to a new current location, to move along the route to indicate the progress along the route.

13. The computer-implemented method of claim 4, wherein a portion of the route is displayed over map data in a turn-by-turn navigation mode.

14. The computer-implemented method of claim 13, wherein the current location graphical element along the route remains within view for a duration of the route in the turn-by-turn navigation mode, and the follow-me indicator indicating the turn remains within view for a portion of the duration of the route until at least the current location graphical element on the route is within the distance threshold.

15. A non-transitory computer-readable medium including instructions stored therein that, when executed by at least one computing device, cause the at least one computing device to:
    cause a follow-me indicator emphasizing a turn to be displayed;
    cause a current location graphical element to be displayed;
    determine the current location graphical element is within a distance threshold of the turn; and
    animate for display the follow-me indicator to indicate the turn, the follow-me indicator being disconnected from the current location graphical element, wherein, in response to the current location graphical element being within the distance threshold, the follow-me indicator moves along the route to another location along the route and disappears from a view of displayed map data.

16. The non-transitory computer-readable storage medium of claim 15, wherein the instructions further cause the at least one computing device to:
    determine a next turn location of the next turn on the route; and
    cause the follow-me indicator to move along the route up to a next turn location, and then remain stationary at the next turn location of the next turn.

17. The non-transitory computer-readable storage medium of claim 15, wherein the instructions further cause the at least one computing device to:
    cause one or more buildings near the route to be displayed, the one or more buildings being displayed as substantially collapsed buildings.

18. The non-transitory computer-readable storage medium of claim 15, wherein the instructions further cause the at least one computing device to:
    obtain information regarding progress along the route, the route including a set of segments;
    determine an updated distance to the second location;
    update a portion of the set of segments of the route to be displayed; and
    provide the updated portion of the set of segments of the route to be displayed.

19. The non-transitory computer-readable storage medium of claim 18, wherein the instructions further cause the at least one computing device to:
    animate substantially in real-time, based at least in part on the obtained progress, a respective current location graphical element, corresponding to a new current location, to move along the route to indicate the progress along the route.

20. The non-transitory computer-readable storage medium of claim 15, wherein a portion of the route is displayed over map data in a turn-by-turn navigation mode.

* * * * *